United States Patent [19]

Vivet et al.

[11] 4,040,001
[45] Aug. 2, 1977

[54] ACOUSTIC WELL LOGGING WITH THRESHOLD ADJUSTMENT

[75] Inventors: Bernard Vivet, Buc; Jean-Claude Trouiller, Chaville; Henri Gruel, Paris, all of France

[73] Assignee: Schlumberger Technology Corporation, New York, N.Y.

[21] Appl. No.: 528,693

[22] Filed: Dec. 2, 1974

Related U.S. Application Data

[63] Continuation of Ser. No. 325,168, Jan. 19, 1973, abandoned.

[30] Foreign Application Priority Data

Jan. 19, 1972 France .............................. 72.01736

[51] Int. Cl.$^2$ .......................................... G01V 1/40
[52] U.S. Cl. ............................ 340/15.5 TN; 328/165; 328/168; 340/15.5 AC; 340/15.5 GC
[58] Field of Search ............... 340/15.5 TN, 15.5 GC, 340/15.5 AP, 15.5 AC, 169; 325/322, 323; 307/235 A; 328/135, 165, 146, 168

[56] References Cited

U.S. PATENT DOCUMENTS

| | | | |
|---|---|---|---|
| 3,289,157 | 11/1966 | Brokaw | 340/15.5 GC |
| 3,437,834 | 4/1969 | Schwartz | 340/15.5 TN |
| 3,475,685 | 10/1969 | Covill | 325/322 |
| 3,576,564 | 4/1971 | Galven | 343/17.1 |
| 3,618,001 | 11/1971 | Zill et al. | 340/15.5 TN |
| 3,676,842 | 7/1972 | Lee | 340/15.5 AC |
| 3,728,672 | 4/1973 | Dennis et al. | 340/15.5 AC |
| 3,828,262 | 8/1974 | Trocquemé | 307/235 R |
| 3,832,577 | 8/1974 | Harr | 328/165 |
| 3,944,942 | 3/1976 | Chudleigh, Jr. | 340/15.5 GC |

*Primary Examiner*—Howard A. Birmiel
*Attorney, Agent, or Firm*—Brumbaugh, Graves, Donohue & Raymond

[57] ABSTRACT

Acoustic well-logging methods and apparatus are provided for investigating earth formations traversed by a borehole. Acoustic waves are transmitted from different points in the borehole and received at other points in the borehole, and a reception signal is generated representative of the received acoustic waves. The time interval between the instant the measurement waves are transmitted and the instant the instantaneous amplitude of the reception signal exceeds a given detection threshold for the first time is measured as a function of depth and the value of the detection threshold is adjusted during each measurement sequence in accordance with the amplitude of the noise received during the next preceding listening interval.

3 Claims, 5 Drawing Figures

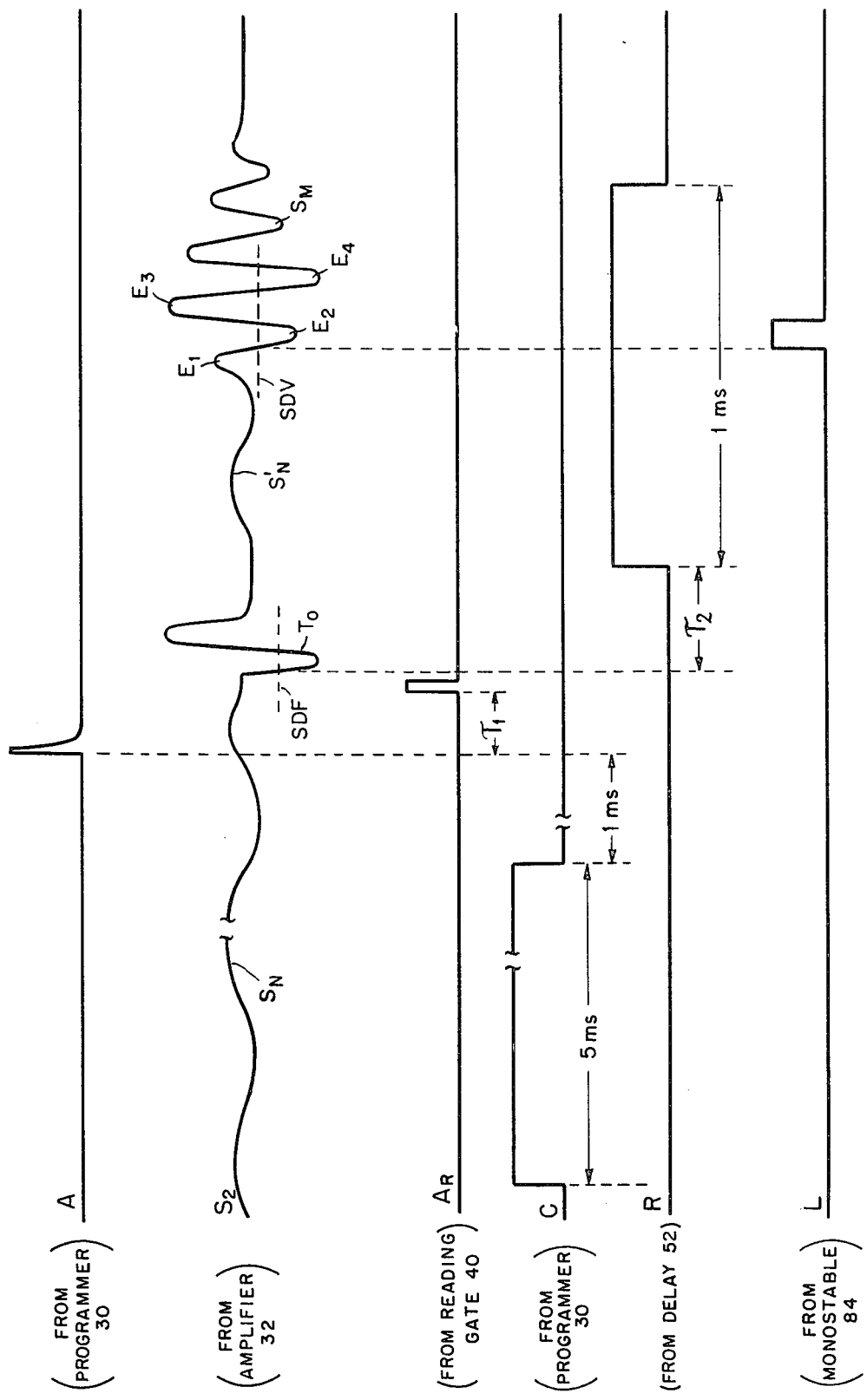

ACOUSTIC WELL LOGGING WITH THRESHOLD ADJUSTMENT

This is a continuation, of application Ser. No. 325,168 filed Jan. 19, 1973, now abandoned.

BACKGROUND OF THE INVENTION

This invention relates to well-logging methods apparatus and, more particularly, to acoustic well-logging methods and apparatus facilitating accurate and automatic detection of the onset of an electric signal generated in response to reception of an acoustic signal indicative of the nature of the formations traversed by the well bore.

Acoustic well-logging methods and apparatus are usually designed to measure the transit time, per unit of length, of acoustic compression waves in earth formations traversed by boreholes, by means of an acoustic measurement wave moving between a transmission point and a reception point.

French Pat. No. 1,349,989 discloses such a method employing two receivers arranged a certain distance from each other, between two transmitters. With such a device, one measures the transit time between the two receivers for measurement waves transmitted respectively by the first and by the second transmitter. By taking the average (i.e., the half-sum) of the transit times thus obtained, an accurate measurement is obtained independent, in particular, of the errors introduced by the tilting of the probe in the borehole.

There are various methods for measuring the transit time of an acoustic wave between a transmitter and a receiver. A current one, disclosed in the patent mentioned above, involves triggering a timing-pluse counter the instant a given half-wave of a synchronous pulse representative of the operating point of the transmitter is applied to the counter's starting circuit and of stopping the counter when the acoustic measurement waves are received and a corresponding half-wave in the signal generated by the receiver is applied to the counter's stopping circuit. The standard shaping of the synchronous transmission pulse is easy, and, consequently, the starting of the counter takes place under favorable conditions. This is not true of the reception signal. Because of the presence of noise superimposed on the measurement signals generated by the receiver, a detection threshold is set for the reception signal so that the counter is not likely to be stopped accidentally by the noise signals. Such noise signals are of two kinds: those picked up by the receiver and those picked up in the cable (crosstalk). The noise signals generated by the receiver are intermittent and can reach a very high amplitude. Such is the case when the probe strikes against the wall of the borehole and, to a lesser extent (longer duration and lower amplitude), when the probe rubs against a borehole wall which has an uneven surface or cavities. The crosstalk noise picked up in the cable is constantly present, and its amplitude is relatively low compared with that of the noise produced by probe impact against the wall of the borehole.

In practice, when one uses a well-logging apparatus without any noise-compensation device, the operator verifies from time to time, on an oscilloscope, the quality of the signals received at the surface, and, when he notices that, within the region being surveyed, the average noise superimposed on the measurement signals increases or decreases significantly, he modifies accordingly the threshold at which the useful half-wave of the reception signal is detected. Under these conditions, the instant the reception signal exceeds the threshold level thus set, a stop signal is applied to the counter. Consequently, it is essential that the operator monitor the conditions under which the measurement is carried out. Such monitoring is tedious, and, in spite of the vigilance of the operator, it often happens that the threshold set for the detection of the measurement signals corresponds only belatedly to the instantaneous noise conditions at probe level, thereby leaving room for transit time measurement errors.

To remedy this situation, U.S. Pat. No. 2,857,011 discloses measuring the amplitude of the noise between the instant the measurement acoustic wave is transmitted and the instant it is received. When the noise amplitude thus measured exceeds a certain threshold, empirically set once and for all in accordance with certain characteristics of the probe and of the formations, the conducted measurement is considered to be poor and is not transmitted to the following circuits. Such a device has many drawbacks. First, since the received measurement signal varies greatly according to the nature of the different earth formations over which the probe is moved, the setting of a single noise threshold, uclid for all measurement conditions, cannot be optimized. Moreover, if the measured noise exceeds the set threshold, the conducted measurement is canceled, even if it was good, which can occur, in particular, when the amplitude to the useful half-wave of the measurement signal is significantly higher than the noise threshold.

A further observation clearly shows that the technique described in the cited patent is not really suited to the problems to be solved. The transit time of an acoustic wave, in the frequently-encountered case where the transmitter and the receiver are about one meter apart, varies from about 125 to 500 microseconds. The noise measurement gate disclosed in the cited patent, which is to operate between the transmission and reception instants, must have an open time substantially shorter than the minimum value of this transit time, i.e., no longer than about 100 microseconds. However, the noise generated by the rubbing of the probe on the walls of the borehole can have a relatively low frequency spectrum (of the order of a few kilohertz). The measurement of the noise amplitude following a single sampling of such brief duration in relation to the average period of this same noise cannot provide reliable information.

SUMMARY OF THE INVENTION

An object of the present invention is to remedy the problems of conventional methods and apparatus outlined above and, in particular, to prove a method and apparatus for constantly adjusting to an optimum value the detection threshold imposed on the reception signal, as a function of the instantaneous noise conditions to which the receiver is subjected.

The foregoing and other objects are attained according to the invention in a well-logging method of the kind in which, during successive sequences, acoustic measurement waves are transmitted at different points of a borehole and then received at other points. A reception signal representative of the received acoustic waves is generated, and a measurement is made, as a function of depth, of the time interval between the instant the measurement waves are transmitted and the instant the instantaneous amplitude of the reception signal passes a given detection threshold for the first time. The method is characterized in that the amplitude of the noise received during the listening interval preceding the instant of transmission of the measurement waves is measured, and the value of the detection threshold is automatically modified in accordance with the noise amplitude thus measured.

Preferably, the measured noise amplitude is the maximum noise amplitude present during a listening interval comparable to or significantly greater than the average period of the probable noise signals.

By virtue of this method, the detection threshold of the useful signal is constantly modified according to the instantaneous noise conditions in the borehole. These conditions depend on the roughness of the borehole wall or on the granular structure of the rocks of the different strata encountered. The different strata generally have a significant thickness; a given noise condition, taking into account the usual probe-raising speeds, thus lasts in general at least one-tenth of a second, i.e., a time interval very much longer than that between the initial instant the noise is sampled and the instant a reception signal is detected. Under these conditions, by placing the detection threshold slightly above the maximum amplitude of the noise detected before transmission, the probability is very small that the noise amplitude during the relatively short time interval between the transmission and the reception of the acoustic measurement waves will be higher than the amplitude measured previously during the relatively long listening interval preceding the transmission. The result is that a minimum detection threshold is always used, thereby allowing the most accurate transit time measurement.

BRIEF DESCRIPTION OF THE DRAWING

A better understanding of the invention can be gained by reference to the following detailed description of the preferred embodiments thereof and to the accompanying drawings in which:

FIG. 5 is a diagram of the different signals appearing during an operating cycle of the apparatus.

DESCRIPTION OF THE PREFERRED EMBODIMENTS

In the following illustration of the preferred embodiments of the invention, we shall confine ourselves, for the sake of simplicity, to a probe comprising a single transmitter and two receivers. Of course, as it will appear below, the present invention can be applied without difficulty to acoustic well-logging apparatus comprising a measurement probe equipped with either a single transmitter and a single receiver or with a plurality of transmitters and receivers.

Figure 1:
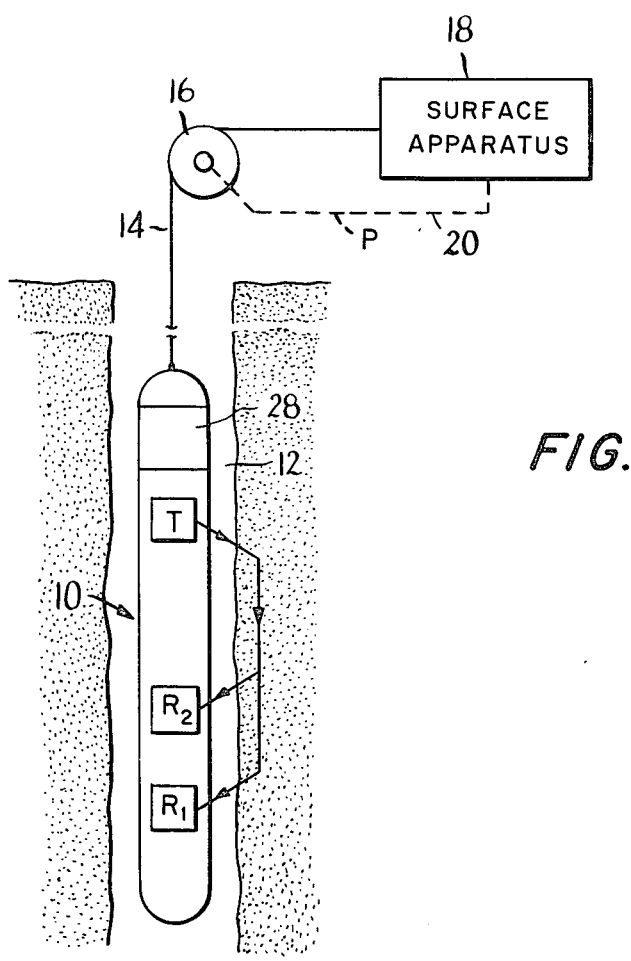
FIG. 1 is a diagrammatic view in elevation of well-logging apparatus in accordance with the invention including a well-logging probe lowered into a borehole traversing earth formations.

FIG. 1 shows an acoustic probe 10 lowered into a borehole 12 by means including a cable 14 which runs over a measurement pulley 16 and is connected to surface apparatus 18 designed to supply the probe 10 with the electric power necessary for its operation and also to process the signals transmitted back to the surface. A mechanical link 20 connects the shaft of the pulley 16 to the surface apparatus 18 so that measurements can be made as a function of the depth D of the probe. The probe 10 comprises an acoustic wave transmitter T and two receivers $R_1$ and $R_2$ located respectively relatively far from and relatively near to the transmitter T. An electronic cartridge 28 contains the downhole electronic components necessary to the proper operation of the probe 10.

Figure 4:
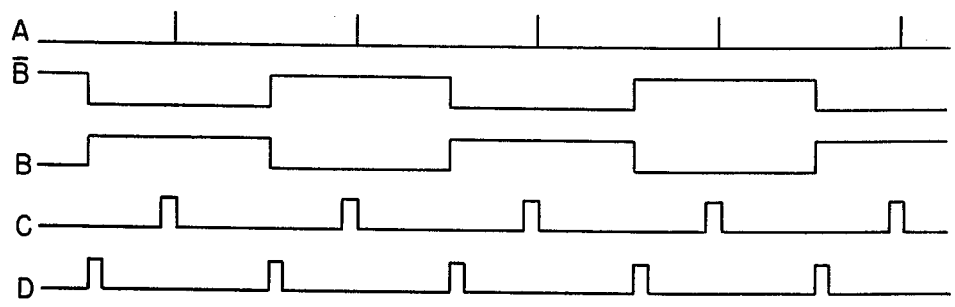
FIG. 4 is a diagram of signals generated by the programmer of FIG. 2.
Figure 2:
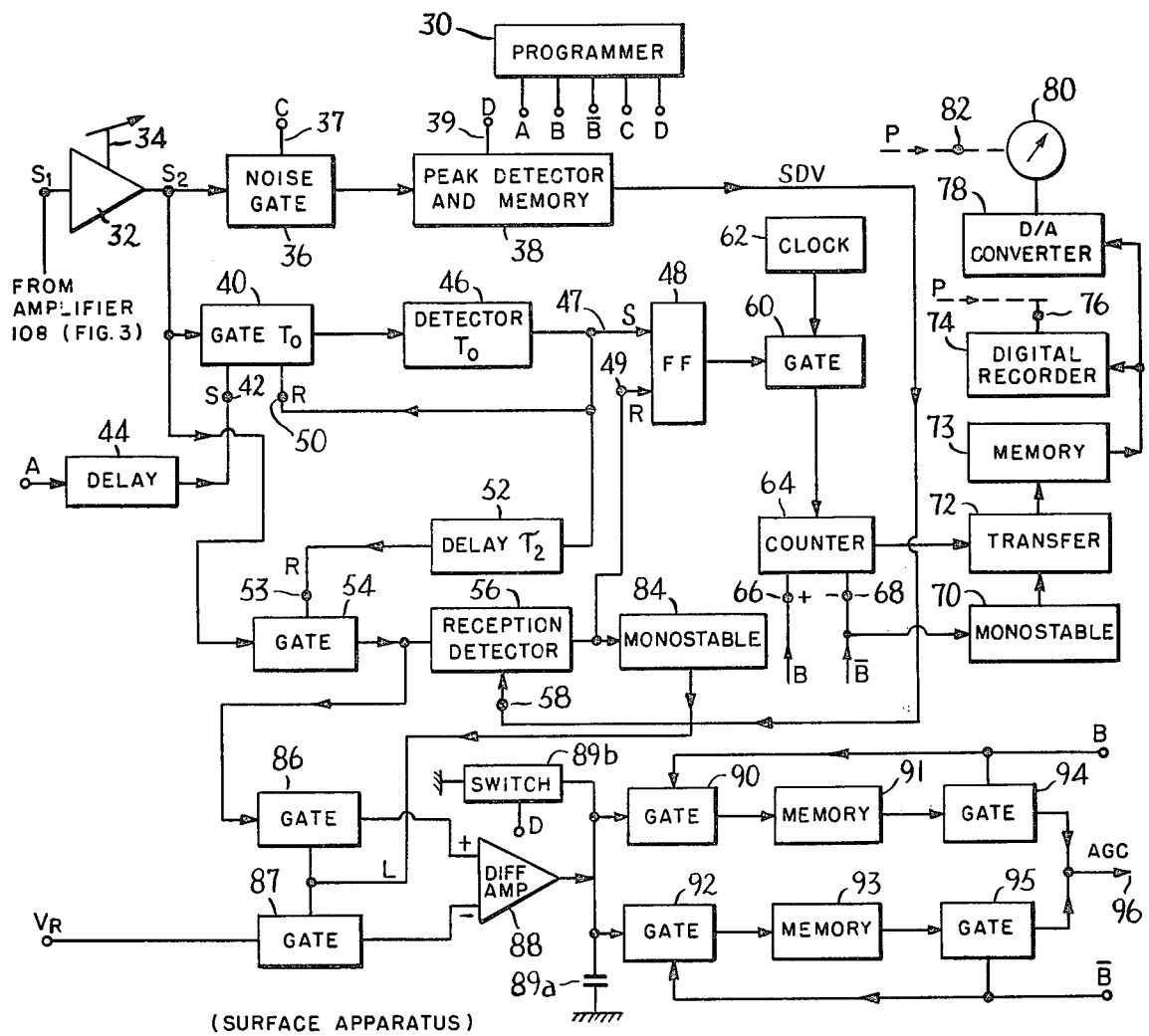
FIG. 2 is a schematic representation of the electronic surface apparatus.

As FIG. 2 shows, the electronic surface apparatus comprises a programmer 30 designed to deliver five synchronization signals respectively designated A, B, $\overline{B}$, C and D, which are shown in FIG. 4.

The signal A is the general timing signal. It comprises relatively short pulses having the same frequency as the electric power network (typically 50 or 60 Hz).

The signals B and $\overline{B}$ are the reception control signals. They are complementary squarewave signals having a frequency equal to half that of the pulses A, with edges out of phase by one half-cycle in relation to the pulses A.

The signals C are noise-listening-control pulses. Their duration is 5 milliseconds and their trailing edge precedes the leading edge of the pulses A by about 1 millisecond.

The signals D are reset control pulses for the noise stored in the memory. Their leading edge is synchronized with the edges of B and $\overline{B}$. Their duration is from 1 to 2 milliseconds.

The composite signal $S_1$ (noise, transmission, reception) transmitted to the surface by the cartridges 28 of the probe 10 is applied to an amplifier 32 whose gain can be adjusted manually by the operator as a function of the attenuation of the particular cable used, by means of a gain control 34. At the output of the amplifier 32, the amplifier composite signal $S_2$ is applied to a noise gate 36 comprising a control terminal 37 to which is applied the noise listening control signal C. The noise gate 36 is followed by a peak detector and memory circuit 38 including a reset terminal 39 to which is applied the cancellation control signal D.

The composite signal $S_2$ is also applied to a gate 40 designed to pass a standard synchronous transmission pulse $T_o$ (see also FIG. 5). For this purpose, the gate 40 comprises an opening control terminal 42 to which is applied, after a delay $T_1$ of about ten microseconds generated by a circuit 44, the general timing pulse A furnished by the programmer 30. The output of the gate 40 is connected to a threshold detector 46 designed to generate an output pulse when the negative half-wave of the standard pulse $T_o$ passes a set threshold SDF (refer again to FIG. 5). This output pulse is applied to the set (active state) terminal 47 of a flip-flop 48, to the reset (passive state) terminal 50 of the gate 40, and, through a delay circuit 52 generating generating a delay $\tau_2$ having a value of about one hundred microseconds (FIG. 5), to the opening control terminal 53 of the reception gate 54. As soon as it receives such a control, the reception gate is designed to remain open for a period of about 1 millisecond. The output signal furnished by the reception gate 54 is applied to a reception detector 56. This reception detector 56 comprises a threshold establishment terminal 58 to which is applied the noise signal measured by the peak detector and memory circuit 38. The output signal of the reception detector 56 is applied to the reset (passive state) terminal 49 of the flip-flop 48. The output signal of the flip-flop 48 is applied to a gate 60 placed between a clock 62 and a pulse counter 64 including an add control terminal 66 and a subtract terminal 68. The signal B generated by the programmer 30 is applied to the add control terminal 65 and the signal $\overline{B}$ is applied to the substract terminal 68. Moreover, this same signal $\overline{B}$ is applied to a monostable circuit 70 designed to be triggered by a descending edge. The output pulse generated by the monostable circuit 70 is applied to a transfer circuit 72 inserted between the counter 64 and a measurement memory 73. The information contiained in the memory 73 is applied to a digital recorder 74 which moreover receives at 76 a depth control signal P developed by the measurement pulley 16. Furthermore, the information contained in the memory 73 is applied to a digital-analog converter 78 followed by a galvanometer recorder 80 including a mechanical input 82 to which is applied the depth control signal P.

The output signal of the reception detector 56 is also applied to a monostable circuit 84 whose output signal L (see FIG. 5) is applied to the control terminals of two reading gates 86 and 87, respectively, receiving the signal delivered by the reception gate 54 and a reference signal $V_R$. The reading gate 86, controlled by the monostable 84, is designed to pass the second half-wave $E_2$ of the useful reception signal (signal $S_2$ in FIG. 5). The signals leaving the gates 86 and 87 are applied to a differential amplifier 88 charged by a capacitor 89a at the terminals of which is placed a discharge switch 89b operating for a short instant under the action of the cancellation pulse D (FIG. 4). The signals at the terminals of the capacitor 89a are rounted, via two gates 90 and 92, respectively, controlled by the reception control signals B and $\overline{B}$, toward two memory circuits 91 and 93. Two other gates 94 and 95, respectively, controlled by B and $\overline{B}$ alternately apply gain control signals, corresponding to one or the other receiver, to an end terminal 96.

Figure 3:
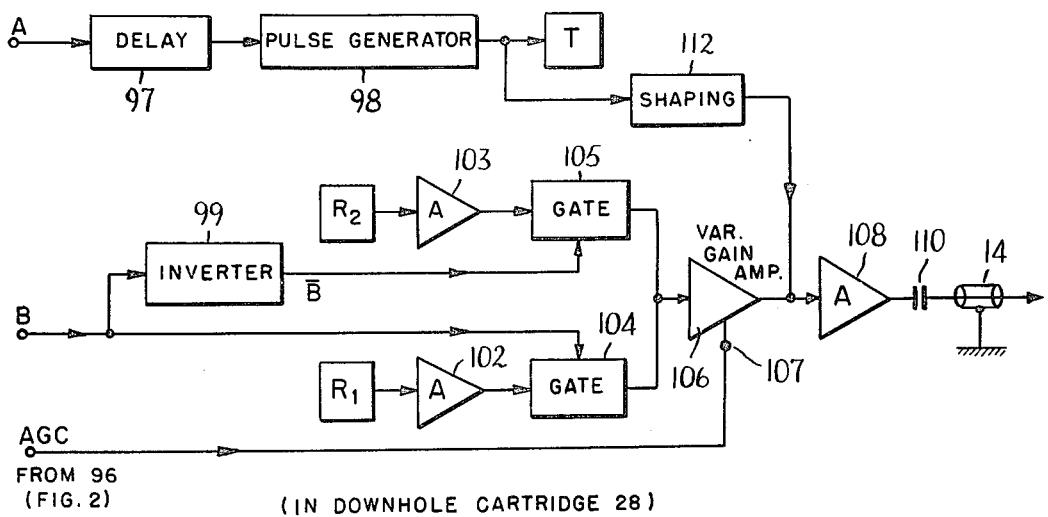
FIG. 3 is a schematic representation of the electronic circuits in a cartridge in the downhole probe.

As FIG. 3 shows, the general timing pulses A generated by the programmer 30, which are supplied to the electronic cartridge 28 by the cable 14, first undergo a safety delay in a circuit 97 before being applied to an electric power supply pulse generator 98 whose output is connected to the acoustic pulse transmitter T. The synchronization signal B generated by the programmer 30 is first inverted in an inverting circuit 99, and the two signals B and $\overline{B}$ thus available are respectively applied to two connection gates 104 and 105. These two gates are respectively placed after two amplifiers 102 and 103 connected to the output of the receivers $R_1$ and $R_2$. The outputs of the gates 104 and 105 are applied to the input of the same variable-gain amplifier 106 having a gain control terminal 107 to which the gain control signal AGC is supplied at the two alternate levels which appear on the terminal 96 of FIG. 2. The output signal of the amplifier 106 is applied to a power amplifier 108 itself connected by a capacitor 110 to the appropriate conductors in the connection cable 14. Also, the power supply pulse generator 98 is connected to a shaping circuit 112 whose output is connected to the input of the amplifier 108 which, under these conditions, delivers the composite signal $S_1$ at its output.

FIG. 5, in which the time scales are only approximately complied with, shows, on the first line. a general timing pulse A generated during a measurement cycle and, on the second line, the amplified composite signal $S_2$ developed by the amplifier 32 from the composite signal $S_1$ transmitted by the amplifier 108 to the surface. From left to right, the composite signal $S_2$ (whose time scale in the left-hand part has an interruption) comprises, first, a noise signal $S_N$ and then a standard pulse $T_o$ (with two symmetrical half-waves), synchronized with the transmission, generated in the electronic cartridge 28 by the shaping circuit 112. The delay between A and $T_o$ as observed at the surface is developed innerently in the cable (during transmission of pulse A from the surface to the tool 10 and transmission of pulse $T_o$ back to the surface) and in the circuit 97. Between the transmission pulse $T_o$ and the measurement pulse proper $S_M$ a noise signal $S'_N$ appears again. On the third line is shown the delayed control pulse $A_R$ of the reading gate 40 of the transmission pulse $T_o$. This pulse $A_R$ is generated by the pulse A after a delay of about 100 microseconds (circuit 44). The noise-listening-control signal C, whose duration is about 5 milliseconds, is shown on the fourth line. The time scale on which this pulse is represented has an interruption. The control pulse C of the noise gate 36 stops about 1 millisecond before the appearance of the pulse A. The fifth line of FIG. 5 shows the control signal R for the reception gate 54. The duration of this signal R is about one millisecond. On the last line of FIG. 5 appears the control signal L for the reading gates 86 and 87 delivered by the monostable 84. Its duration is about 20 μs.

The apparatus operates as follows. When the programming circuit 30 delivers a general timing pulse A, this pulse passes through the cable 14, and, after a first delay produced by the cable itself and a second safety delay introduced by the circuit 97, a pulse is generated by the pulse generator 98 and applied to the transmission transducer T. This same pulse delivered by the pulse generator 98 is shaped at 112, and, after being applied to the cable 14 by the power amplifier 108, it appears at the surface in the form of a pulse $T_o$ made up of two half-waves having a standard amplitude (second line, FIG. 5). A measurement sequence includes two cycles and, consequently, two pulses $T_o$.

The synchronization signals B and $\overline{B}$ successively generated by the programmer 30 during the two cycles of a sequence are respectively applied to the connection gates 104 and 105 (FIG. 3) and consequently allow, in turn, the signals generated by the receivers $R_1$ and $R_2$ and preamplified at 102 and 103 to be applied to the variable-gain amplifier 106. Simultaneously with the selection of the receivers $R_1$ and $R_2$, the counter 64 is placed, by means of synchronization signals B and $\overline{B}$, in an add or substract state depending on whether the distant receiver $R_1$ or the nearby receiver $R_2$ has been selected. The differential measurement of the transit time between $R_1$ and $R_2$ is transferred to the measurement memory 73 at the end of each measurement sequence. It is recorded as a function of depth D in digital form at 74 and/or in analog form at 80.

As FIG. 4 shows, the receivers $R_1$ and $R_2$ are respectively connected to the connection cable 14 by the signals B and $\overline{B}$ far ahead of the appearance of the periodic general timing pulse A. The result is that, when one of these receivers is connected to the amplifier 106 via one of the other of the gates 104 and 105, the noise signal $S_N$ constantly generated by the receivers is transmitted to the surface. As FIG. 5 shows, the represented noise signal $S_N$ has a period significantly longer than the period of the measurement signals $S_M$ generated by the receivers when the latter receive the acoustic measurement wave transmitted by the transmitter 22. Since the noise gate 36 is opened by a control signal C whose duration is comparable to, and preferably much greater than, the average period of the noise signals, the peak detection and memory circuit 38 can, during the existence of a noise-listening-control pulse C, detect the peak value of the noise at that instant: i.e., just before the transmission of an acoustic measurement pulse. Under these conditions, the reception detection circuit 56 receives, at its threshold-establishment terminal 58, a signal SDV whose amplitude is constantly determined by the maximum amplitude of the noise that exists shortly before the transmission of an acoustic pulse by the transmitter T. The detection circuit 46, which receives a standard pulse $T_o$ synchronized with the transmission, has a detection threshold SDF with a fixed value. The instant the signal $T_o$ passes this threshold (negative in the present case), a pulse is generated by the circuit 46 and applied to the set (active state) control terminal 47 of the flip-flop 48, this same pulse being applied to the reset (passive state) terminal 50 of the reading gate 40 of the pulse $T_o$.

Moreover, the detection pulse generated by the detector 46 is applied via a delay circuit 52 to the reception reading gate 54. FIG. 5 shows (next to last line), the delay $\tau_2$ introduced by the circuit 52 is about 120 µs, and, consequently, the reading gate 54 is blocked until the closest probable instant of appearance of the measurement signal $S_N$. When the reception reading gate 54 is open, it applies the measurement signal $S_M$ to the reception detector 56. The detection threshold SDV applied to the terminal 58 is slightly higher (a few tenths of millivolts if $E_2$ is a few volts) than the noise signal $S_N$ measured before the concerned transmission. Under these conditions, the precise instant the measurement signal $S_M$ crosses for the first time the threshold thus established is practically unaffected by the presence of noise. Because of the approximately sinusoidal shape of the second half-wave $E_2$ (negative) of the measurement signal $S_M$, it is desirable to set a threshold as low as possible so that the instant of detection is as close as possible to the instant the measurement signal crosses the zero amplitude for the first time.

The moment the noise signal is detected by the gate 36, the gain of the downhole amplifier 106 has already been determined by the gain control signal AGC (from the rising edge of B or $\bar{B}$) as a function of the average amplitude of the second half-wave $E_2$ of the measurement signal applied via the gate 86 to the differential amplifier 88 during the preceding sequence, so that the value of the signal-to-noise ratio $S_M/S_N$ at the level of the receiver remains, throughout the entire duration of the composite signal $S_2$, applied to the processing circuits located at the surface.

As previously indicated, the gain control signal AGC that appears at the terminal 96 has two levels, respectively assigned to the measurement signals generated by the receivers $R_1$ and $R_2$ to be amplified. These two levels are the two error signals successively obtained by the integration of the output signal of the differential amplifier 88 throughout the half-wave $E_2$. They are respectively stored in the memories 91 and 93 to be used during the following sequence. At the end of each of the two cycles of a measurement sequence, the capacitor 89a is reset by the closing of the switch 89b in response to the cancellation pulse D. Owing to the time necessary for modifying the gain of the down-hole amplifier 106 under the action of the signal AGC produced at the surface, the updating of the memories 91 and 93 during the existence of the half-wave $E_2$ does not affect the gain applied at this instant to the measurement signal $S_M$ generated by the receiver used. Under these conditions, since the measurement probe 10 is moved a very short distance between the two consecutive operating instants of the same receiver, it may be considered that the attenuation undergone by the measurement acoustic wave between the transmitter and this particular receiver ($R_1$ or $R_2$) during the two successive measurement sequences is in practice the same, so that the gain control AGC applied to the gain control terminal 107 of the variable-gain amplifier 106 is actually adjusted in such a manner that the average amplitude of the second half-wave $E_2$ of the measurement signal $S_M$ has a constant value determined by $V_R$. The automatic gain control signal AGC may be either analog or digital. In the first case, it may vary in a continuous manner or in steps. In the second case, an analog-digital converter must be provided after the integrating capacitor 89a.

By virtue of these arrangements, the measurement of the transit time of an acoustic wave between the transmitter and one of the receivers is always carried out under optimum conditions. The adjustment of the reception pulse detection threshold is now performed without the intervention of the operator so that his work is lightened and the efficiency of the system is no longer dependent upon his alertness.

The combination of an automatic device for determining the reception signal detection threshold and an automatic gain control is particularly advantageous. Owing to the automatic gain control, the amplitude of the useful half-wave of the measurement signal is N standardized, while the noise at the level of the receiver, which is measured before the following transmission, is itself affected by the gain imposed on the amplifier 106 throughout the measurement cycle including this transmission. The result is that the threshold SDV set for the detection of the reception signal is constantly determined by the signal-to-noise ratio $S_M/S_N$ at the level of the receiver used. In fact, the noises picked up by the cable 14 are amplified much less than the actual measurement signal. The result is that, in the measurement of the noise signal $S_N$ carried out at the surface by the noise listening gate 36 and the noise detecting circuit 38, the noises picked up by the cable are significantly reduced in relation to those picked up by the receivers $R_1$ and $R_2$.

The moment one of the signals B or $\bar{B}$ is triggered, a pulse D is generated by the programmer 30 having the effect of resetting the memory of the detector circuit 38. Under these conditions, the noise signal detection and sampling device 38 is at zero when a new cycle begins. Consequently, the reception detector 56 is constantly adjusted in accordance with the instantaneous noise conditions at the level of the connected receiver.

Such a system operates properly as long as the signal-to-noise ratio $S_M/S_N$ at the level of the connected receiver is higher than about 1.3. In the opposite case — but as long as the signal-to-noise ratio is higher than unity — any variation in the maximum noise amplitude results in a slight variation in the measured transit time. In this case, the measurement signal $S_M$ then crosses the set threshold at a point on the half-wave $E_2$ where the slope of the signal is relatively small. The result is that, in the case where $1 < S_M/S_N < 1.3$, a slight variation in the amplitude of the threshold SDV is accompanied by a significant variation in the measured transit time.

In the case where the signal-to-noise ratio is lower than unity, the detection device according to the invention is obviously disfavored. However, statistically, such a situation is rare provided sufficient precautions have been taken concerning the production, propagation and filtering conditions of the noise in the probe.

The use of an automatic detection device according to the invention thus allows a considerable reduction in the number of transit time errors due to a half-wave skip (detection on $E_4$ instead of $E_2$; see FIG. 5), which generally occurs when the task of adjusting the reception signal detection threshold is entrusted to an operator.

If the well-logging equipment used includes, as in the case of the French Pat. No. 1,349,989, two transmitters and two receivers and a measurement sequence composed of four successive cycles, the implementation of the methods of the invention does not involve any particular difficulty, in the light of the patent and of the description above.

The embodiment described above is merely exemplary, and those skilled in the art may make many variations and modifications therein without departing from the spirit and scope of the invention. All such modifications and variations are intended to be within the scope of the invention as defined in the appended claims.

We claim:

1. An acoustic well-logging method for investigating earth formations traversed by a borehole, comprising the steps of:
    a. generating a composite electric signal which is a function of time and which comprises (i) a signal received during a first time interval which precedes the time of transmission of an acoustic pulse into said formation at a first location and which is longer than the time interval between said transmission time and an expected time of reception of said acoustic pulse at a second location after propagation in said formations and (ii) a reception signal received during a second time interval representative of said expected reception time of said acoustic pulse, said composite electric signal inherently including long-period noise in addition to the above;
    b. measuring the maximum amplitude of the noise within said first time interval;
    c. adjusting said composite electric signal so that a selected portion of said reception signal is maintained substantially at a predetermined amplitude exceeding the maximum measured amplitude of the noise;
    d. generating a threshold signal and adjusting it so that its amplitude barely exceeds said maximum measured amplitude of the noise; and
    e. making a measurement corresponding to the time difference between (i) a time having a known relation to said time of transmission and (ii) the portion of said reception signal which earliest exceeds said threshold, said measurement therefore accurately representing the time required for passage of said acoustic pulse through said formations from said first location to said second location.

2. A method wherein the steps to claim 1 are performed in a number of cycles and wherein said adjustment of the composite electric signal during any given cycle is based upon the amplitude of said selected portion of said reception signal during a preceding cycle.

3. Acoustic well-logging apparatus for investigating earth formations tranversed by a borehole, comprising:
    a. means for generating a composite electric signal which is a function of time and which comprises (i) a standard pulse representative of transmission of an acoustic pulse into said formations at a first location and (ii) a reception signal representative of a later reception of said acoustic pulse at a second location after propagation in said formations, said composite electric signal inherently representing noise in addition to the above;
    b. means for measuring the maximum amplitude of the noise within an interval of said composite electric signal which precedes said standard pulse and is longer than the interval between said standard pulse and said reception signal;
    c. means for adjusting said composite electric signal so that a selected portion of said reception signal is maintained substantially at a predetermined amplitude exceeding the maximum measured amplitude of the noise;
    d. means for generating a threshold signal and adjusting it so that its amplitude barely exceeds said maximum measured amplitude of the noise; and
    e. means for making a measurement corresponding to the time difference between (i) a selected position of said standard pulse and (ii) the portion of said reception signal which earliest exceeds said threshold, said measurement therefore accurately representing the time required for passage of said acoustic pulse through said formations from said first location to said second location.

* * * * *

UNITED STATES PATENT AND TRADEMARK OFFICE
CERTIFICATE OF CORRECTION

PATENT NO. : 4,040,001
DATED : August 2, 1977
INVENTOR(S) : Bernard Vivet et al

It is certified that error appears in the above-identified patent and that said Letters Patent are hereby corrected as shown below:

Col. 2, line 24, "uclid" should read -- valid --; Col. 2, line 29, "to" should read -- of --; Col. 2, line 52, "prove" should read -- provide --; Col. 4, line 45, "T$_1$" should read -- $\tau_1$ --; Col. 5, line 3, "substract" should read -- subtract --; Col. 5, line 9, "contiained" should read -- contained --; Col. 5, line 62, "line." should read -- line, --; Col. 6, lines 5-6, "innerently" should read -- inherently --; Col. 6, line 47, "substract" should read -- subtract --; Col. 6, line 59, "of the other" should read -- or the other --; Col. 8, line 28, "N" should read -- constantly --; Col. 9, line 22, "borehold" should read -- borehole --; Col. 10, line 9, "to" should read -- of --; Col. 10, line 15, "tranversed" should read -- traversed --; and Col. 10, line 39, "position" should read -- portion --.

Signed and Sealed this

Sixth Day of December 1977

[SEAL]

Attest:

RUTH C. MASON
Attesting Officer

LUTRELLE F. PARKER
Acting Commissioner of Patents and Trademarks